(12) United States Patent  (10) Patent No.: US 7,646,513 B2
Miyashita et al.  (45) Date of Patent: Jan. 12, 2010

(54) IMAGE PROCESSING DEVICE AND METHOD THEREOF

(75) Inventors: Masaki Miyashita, Tokyo (JP); Junichi Kamai, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 716 days.

(21) Appl. No.: 11/231,780

(22) Filed: Sep. 22, 2005

(65) Prior Publication Data

US 2006/0089187 A1   Apr. 27, 2006

(30) Foreign Application Priority Data

Sep. 22, 2004   (JP) .............................. 2004-276062

(51) Int. Cl.
*G06K 15/00* (2006.01)
*H04N 1/405* (2006.01)

(52) U.S. Cl. ........................ 358/3.11; 358/3.09; 358/3.1

(58) Field of Classification Search ................ 358/1.18, 358/1.9, 3.09, 3.12, 3.26, 3.28, 450, 540
See application file for complete search history.

(56) References Cited

U.S. PATENT DOCUMENTS

| 2002/0060684 | A1* | 5/2002 | Alcorn et al. ................ 345/552 |
| 2002/0122043 | A1 | 9/2002 | Freeman et al. |
| 2003/0080963 | A1* | 5/2003 | Van Hook et al. ........... 345/501 |
| 2003/0164838 | A1 | 9/2003 | Guo et al. |

OTHER PUBLICATIONS

Akenine-Moller T., et al., "Real-Time Rendering, $2^{nd}$ Edition" 2002, p. 118-129, Natick, MA.
Cohen et al., "Wang Tiles for Image and Texture Generation" ACM Transactions on Graphics, ACM, US, vol. 22, No. 3, Jan. 1, 2003, pp. 287-294.
European Search Report issued Oct. 28, 2008, in European patent application No. EP05255894.
Efros, Alexei, et al., Image Quilting for Texture Synthesis and Transfer, Proceedings of the $28^{th}$ annual conference on computer graphics and interactive techniques, Dec. 31, 2001, pp. 341-346.

* cited by examiner

*Primary Examiner*—James A Thompson
(74) *Attorney, Agent, or Firm*—Finnegan, Henderson, Farabow, Garrett & Dunner, L.L.P.

(57) ABSTRACT

Provided is an image processing device and method capable of making the joint of an original image and a reverse image less noticeable. A CPU processes image data stored in an external memory device for storing an information resource for an electronic game, and displaying the electronic game target on a screen of a display device based on the processing results. Thereupon, when generating an original image and a reverse image as a repeat image, the CPU deletes an image worth 0.5 dots of a pixel belonging to an area adjacent to the reverse image among the pixels of the original image, deletes an image worth 0.5 dots of a pixel belonging to an area adjacent to the original image among the pixels of the reverse image, generates a single image by alternately arranging the original image and reverse image where an image worth 0.5 dots was deleted, executes the embedding of an image, and thereby displays this image as the repeat image.

8 Claims, 8 Drawing Sheets

(a)

64

(b)

66

(a)

(b)

(c)
(d)

(a)

(b)

(c) (d)

IMAGE PROCESSING DEVICE AND METHOD THEREOF

BACKGROUND

1. Field of the Invention

The present invention relates to an image processing device and method thereof for processing image information of an electronic game and displaying an image of the electronic game, and displaying an image of a broad area with a prescribed image.

2. Description of the Related Art

An electronic game system is equipped with an image processing device for processing image information for the electronic game and displaying the processing results on a display screen. In this type of image processing device, as the image information for the electronic game, for instance, upon generating an image of a broad area with a specific image, generally adopted is a method of repeatedly attaching this specific image numerous times to fill the broad image area, and, as the specific image, an original image and a reverse image where the original image is reversed are used, and the two images are attached alternately and repeatedly in order to make the joint of images less noticeable.

For example, as shown in FIG. 8, upon attaching a texture material 50 having an image size of 6 dots×6 dots to a quadrilateral polygon 52 in order to generate an original image 54, the overall texture material 50 is attached to the polygon 52, and the original image 54 and a reverse image 56 are alternately arranged in the horizontal direction (longitudinal direction) and perpendicular direction (vertical direction) so as to fill the broad image area with the original image 54 and reverse image 56, reduce the memory capacity, and to make the joint of the original image 54 and reverse image 56 less noticeable (less conspicuous).

SUMMARY

Nevertheless, with the conventional technology, since the texture material 50 is attached to the polygon 52 as is, when the original image 54 and reverse image 56 are arranged, the original image 54 and reverse image 56 are connected with pixels of the same color, same colored two-bit pixels are arranged at the joint of the original image 54 and reverse image 56, and there is a problem in that the joint of the original image 54 and reverse image 56 is noticeable.

Thus, an object of the present invention is to make the joint of the original image and reverse image less noticeable.

In order to achieve the foregoing object, the image processing device according to the present invention has a memory for storing an information resource for an electronic game; an image processing unit for processing image information for the electronic game based on the information resource stored in the memory; and a display unit for displaying images of the electronic game target based on the processing results of the image processing unit; wherein the image processing unit generates, as a repeat image, an original image by attaching a texture material to a polygon; upon generating a reverse image of the original image, deletes a partial image of a pixel belonging to an area adjacent to another image among the pixels of the original image and the reverse image; and generates a prescribed image by alternately arranging the original image and reverse image where the partial image thereof has been deleted.

According to the foregoing configuration, upon generating, as a repeat image, an original image and a reverse image by attaching a texture material to a polygon, since a partial image of a pixel belonging to an area adjacent to another image among the pixels of the original image and the reverse image is deleted, and a prescribed image is generated by alternately arranging the original image and reverse image where the partial image thereof has been deleted, the image of the joint of the original image and reverse image will become small, and the joint of such original image and reverse image can be made less noticeable.

Further, with the image processing device according to the present invention, upon the image processing unit generating, as a repeat image, an original image by attaching a texture material to a polygon and also generating a reverse image of the original image, the image processing unit may delete a partial image of a pixel belonging to an area adjacent to another image among the pixels of the original image and the reverse image, and form a one-dot pixel in an area where the original image and the reverse image are mutually adjacent; and generate a prescribed image by alternately arranging the original image and reverse image where the partial image thereof has been deleted.

When generating, as a repeat image, an original image by attaching a texture material to a polygon and also generating a reverse image of the original image, an image worth specific dots of a pixel belonging to an area adjacent to the reverse image among the pixels of the original image is deleted, an image in which the sum thereof with the image worth specific dots becomes an image worth one dot is deleted, and a one-dot pixel is formed in an area where the original image and the reverse image are mutually adjacent as an image of a pixel belonging to an area adjacent to the original image among the pixels of the reverse image.

Further, the image processing unit may have a function of deleting an image worth 0.5 dots of a pixel subject to deletion among the pixels of the original image, and deleting an image worth 0.5 dots of a pixel subject to deletion among the pixels of the reverse image.

Further, the image processing method according to the present invention is a method to be executed with an image processing device having an image processing unit which processes image information for an electronic game based on an information resource for the electronic game, and displays the respective processing results on a display unit, having: an image attachment step of generating, as the repeat image, an original image by attaching a texture material to a polygon, and, upon generating a reverse image of the original image, deleting a partial image of a pixel belonging to an area adjacent to another image among the pixels of the original image and the reverse image; and an image embedding step of generating a prescribed image by alternately arranging the original image and reverse image where the partial image thereof has been deleted at the image attachment step.

According to the foregoing method, upon generating, as a repeat image, an original image and a reverse image by attaching a texture material to a polygon, since a partial image of a pixel belonging to an area adjacent to another image among the pixels of the original image and the reverse image is deleted, and a prescribed image is generated by alternately arranging the original image and reverse image where the partial image thereof has been deleted, the image of the joint of the original image and reverse image will become small, and the joint of such original image and reverse image can be made less noticeable.

Further, when adopting the image information processing method according to the present invention, the image processing unit may generate, as a repeat image, an original image by attaching a texture material to a polygon; upon generating a reverse image of the original image, delete a partial image of a pixel belonging to an area adjacent to another image among the pixels of the original image and the reverse image, and form a one-dot pixel in an area where the original image and the reverse image are mutually adjacent; and generate a prescribed image by alternately arranging the original image and reverse image where the partial image thereof has been deleted.

Or, upon the image processing unit generating, as a repeat image, an original image by attaching a texture material to a polygon and also generating a reverse image of the original image, the image processing unit may delete an image worth specific dots of a pixel belonging to an area adjacent to the reverse image among the pixels of the original image; delete an image in which the sum thereof with the image worth specific dots becomes an image worth one dot, and form a one-dot pixel in an area where the original image and the reverse image are mutually adjacent as an image of a pixel belonging to an area adjacent to the original image among the pixels of the reverse image.

Further, the image processing unit may have a function of deleting an image worth 0.5 dots of a pixel subject to deletion among the pixels of the original image, and deleting an image worth 0.5 dots of a pixel subject to deletion among the pixels of the reverse image.

Further, the recording medium according to the present invention has recorded thereon a program for causing the image processing means to execute the respective steps described above.

In the present invention, a repeat image is obtained by reversing the texture to be attached to mutually adjacent polygons so that it will become symmetrical with the adjacent boundary line as the center thereof. This texture corresponds to the original image. Further, the reversed texture corresponds to the reverse image.

According to the present invention, since the image of the joint of the original image and reverse image can be made small, the joint of such original image and reverse image can be made less noticeable.

DETAILED DESCRIPTION

Figure 1:
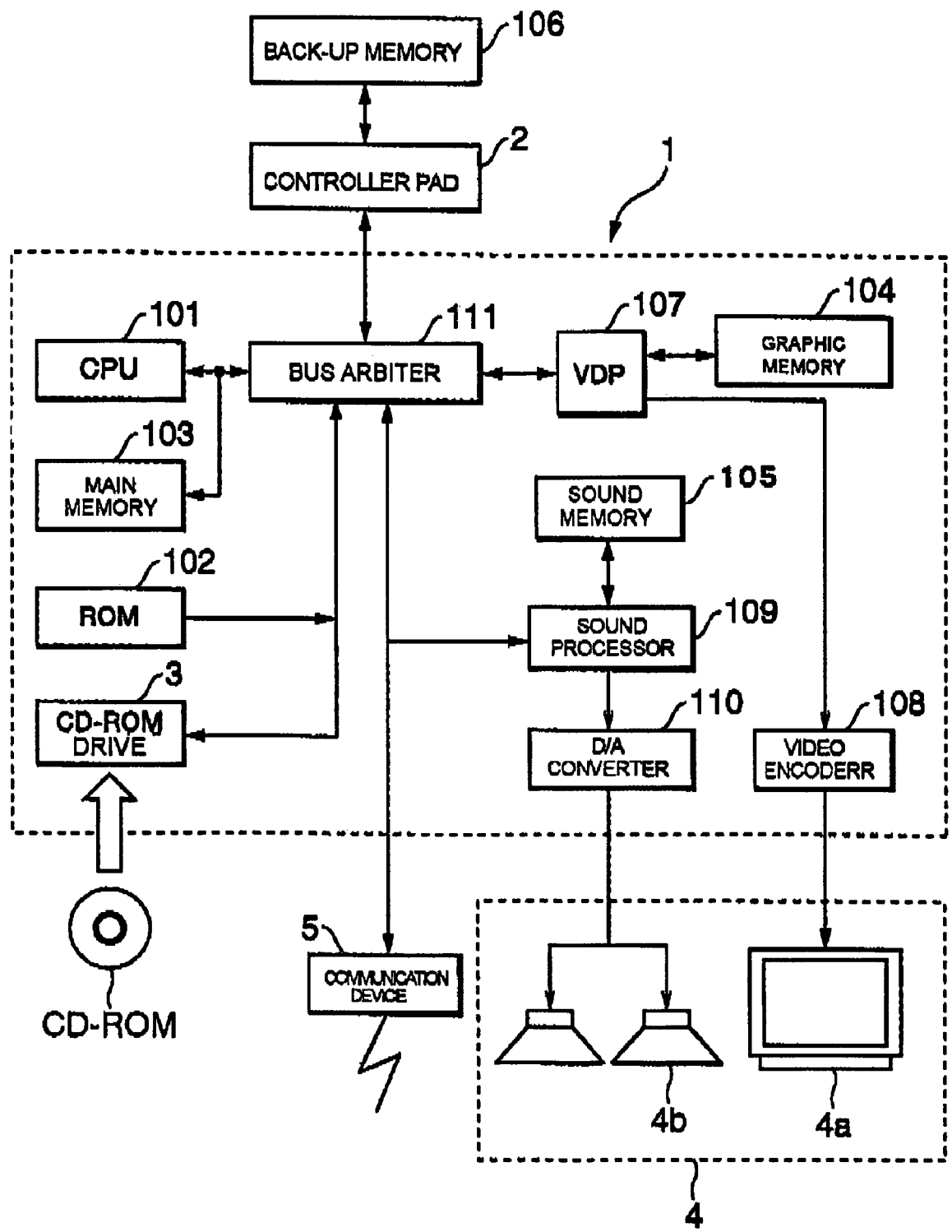
FIG. 1 is a block configuration of an image processing device showing an embodiment of the present invention.
Figure 2:
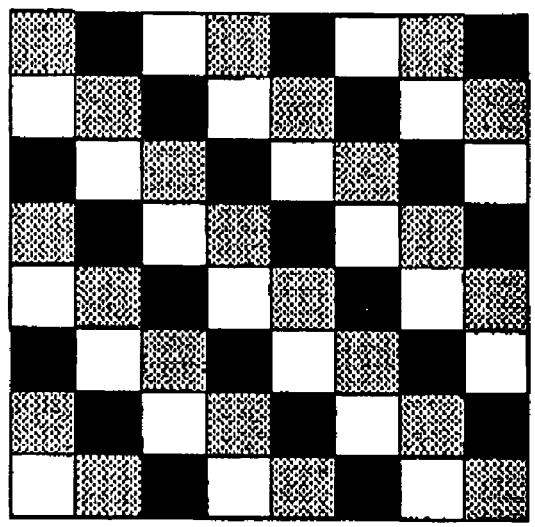
FIGS. 2(a) and (b) are diagrams showing a display example of an original image and a reverse image of the image processing device according to the present invention.
Figure 2:
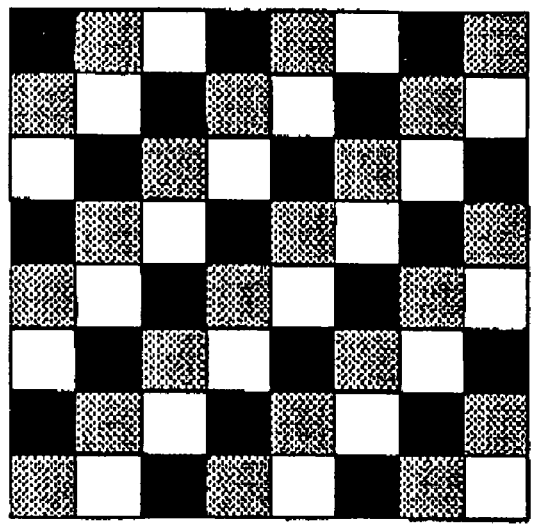

An embodiment of the present invention is now explained with reference to the drawings. FIG. 1 is a block configuration of the image processing device showing an embodiment of the present invention. In FIG. 1, the image processing device, as one element of an electronic game system, executes information processing such as for image processing pertaining to the electronic game with the CPU playing a central role. This image processing executes image display control of displaying a target disposed in a virtual three-dimensional space on a display screen by setting a three-dimensional spatial coordinate system and a three-dimensional coordinate system which follows the movement of the viewpoint, and performing coordinate conversion to the target belonging to the spatial coordinate system and converting it into a viewpoint coordinate system with the projection emitted from the viewpoint. FIG. 2(a) is a display example of an original image, and FIG. 2(b) is a display example of a reverse image.

The electronic game system illustrated in FIG. 1, as a game terminal, has a control unit 1 configured from the likes of a CPU 101, an input device 2 for a game player to input operation signals to the control unit 1, an external memory device 3 for storing an operating system (hereinafter referred to as an "OS") and an application program (game program) and inputting these programs into the control unit 1 as necessary, and an output device 4 configured from the likes of a display device 4a and speaker 4b for providing images and sounds to the game player. Further, this electronic game system has a communication device 5 for transmitting and receiving data to and from other computers or game apparatuses via a telephone line or the like. Incidentally, the external memory device 3 is not limited to the illustrated CD-ROM or the like, and may also be a recording medium or the like capable of writing and storing data from the control unit 1.

When the power is turned on so as to start the game, a boot program loader not shown loads a boot program (also referred to as an initial program) stored in a ROM into the CPU 101, and the CPU 101 executes the boot program. The CPU 101 loads all or the required portion of the OS stored in the likes of a CD-ROM into a main memory 103 according to this boot program and executes the OS.

The CPU 101, under the control of this OS, loads all or the required portion of an application program (hereinafter sometimes simply referred to as a "program") stored in the likes of a CD-ROM into the main memory 103, further loads drawing data or image data stored in the likes of a CD-ROM into a graphic memory 104 as required, and also loads sound data into a sound memory 105.

The CPU 101, under the control of the OS, executes the application program stored in the main memory 103. Data accompanying the execution of the application program is written into the main memory 103 or backup memory 106 and referred to as required. The backup memory 106 stores data in order to retain the status theretofore even if the power is cut off due to the discontinuance of the game. Incidentally, although the present embodiment is configured such that the OS, application program and so on are provided from a CD-ROM, for instance, the configuration may also be such that these are provided from a ROM, or supplied from another computer via a network.

A video display processor (VDP) 107 reads drawing data stored in the graphic memory 104 required for displaying images and performs various information processing (image processing) based on a command or data from the CPU resulting from the execution of the application program in order to generate image data as image information. As various types of image processing, for example, texture mapping, light source processing, display priority processing and so on may be considered.

In order to display the generated image data on the display device 4a, the VDP 107 outputs image data to an encoder 108. Incidentally, the generated image data, for instance, may be written into a frame buffer memory or the like, and read from this frame buffer memory in a prescribed timing.

A sound processor 109 reads sound data stored in the sound memory 105 and performs various types of information processing (sound processing) based on a command or data from the CPU resulting from the execution of the application program. As various types of sound processing, for instance, effect processing, mixing processing and so on may be considered. Sound data subject to various types of sound processing is converted into analog data with a D/A converter 110, and output to the speaker 4b.

A bus arbiter 111 performs the control between the respective units connected via a data transmission channel (bus). For example, the bus arbiter 111 decides the order of priority among the respective units or assigns the bus occupancy time of the occupying unit in order to decide which unit will occupy the bus.

The image processing device of the present invention configured as described above will realize the prescribed functions pertaining to the present invention by the CPU 101 executing a program loaded from an external storage medium such as a CD-ROM.

Figure 3:
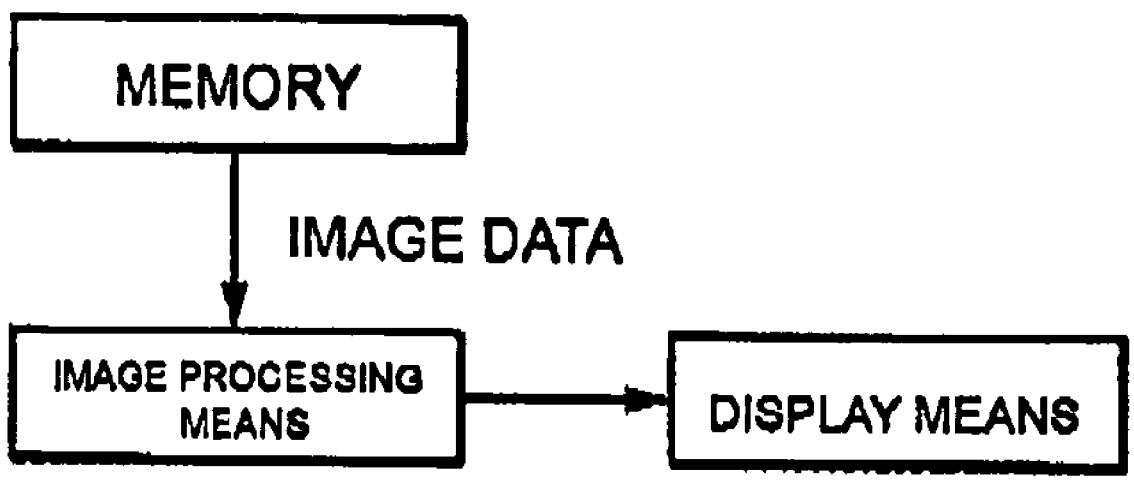
FIG. 3 is a functional block diagram of the image processing device according to the present invention.

FIG. 3 is a schematic functional block diagram for explaining the main contents of the electronic game system processing to be executed by the main CPU 101. The CPU 101 as an image processing means, after the start of the game program, processes image information (image data) for an electronic game based on an information resource stored in a memory (external memory device 3) for storing the information resource for the electronic game. When generating a repeat image while displaying the electronic game target on a display means (display device 4a) based on these processing results, the CPU 101 generates an original image and a reverse image for filling a broad image area with a single image (a continuous image obtained by alternately reversing and arranging a single texture), generates a single image by alternately arranging the original image and reverse image, and thereby displays the generated image on the screen of the display means.

Figure 4:
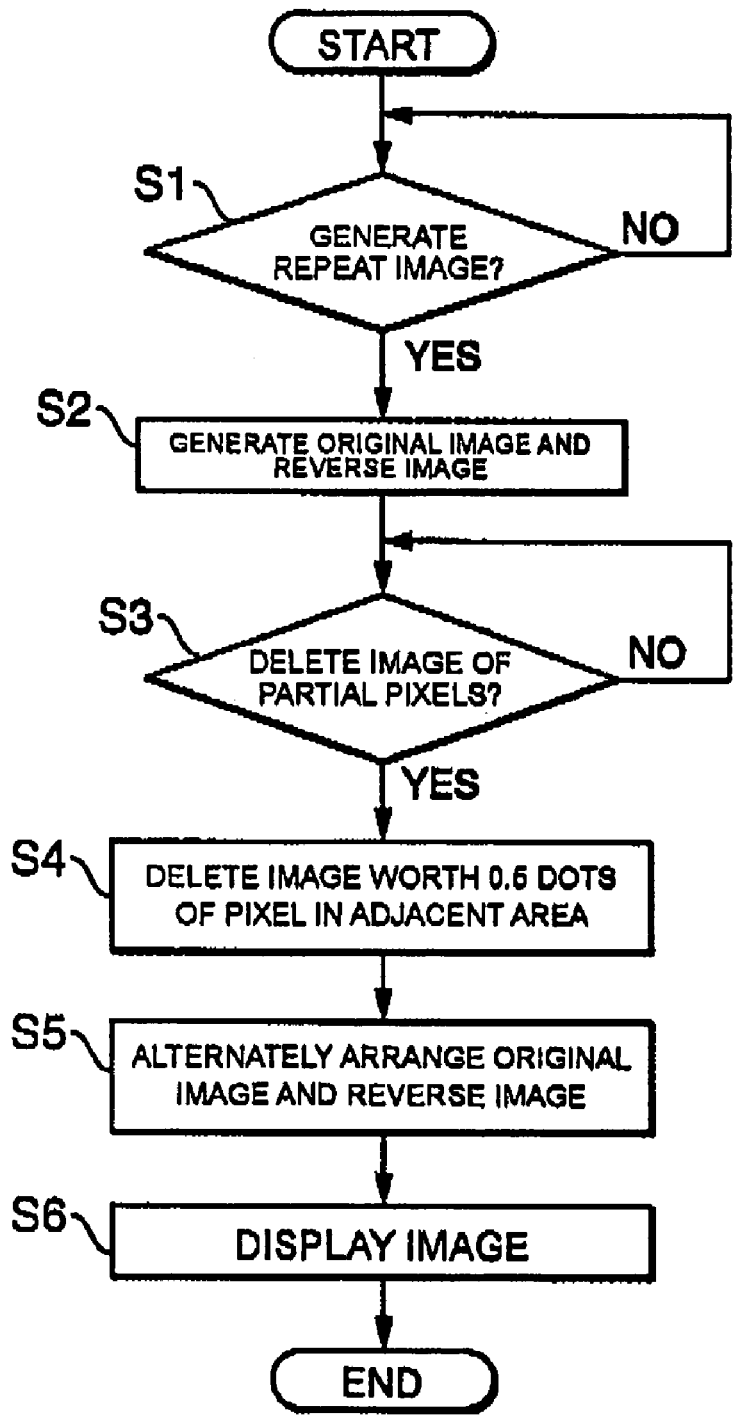
FIG. 4 is a flowchart for explaining the operation of the image processing device according to the present invention.
Figure 5:
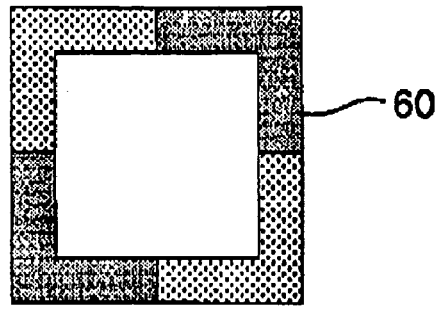
FIGS. 5(a) to (d) are diagrams showing the generation process of a repeat (replayed) image of the image processing device according to the present invention.
Figure 5:
Figure 5:
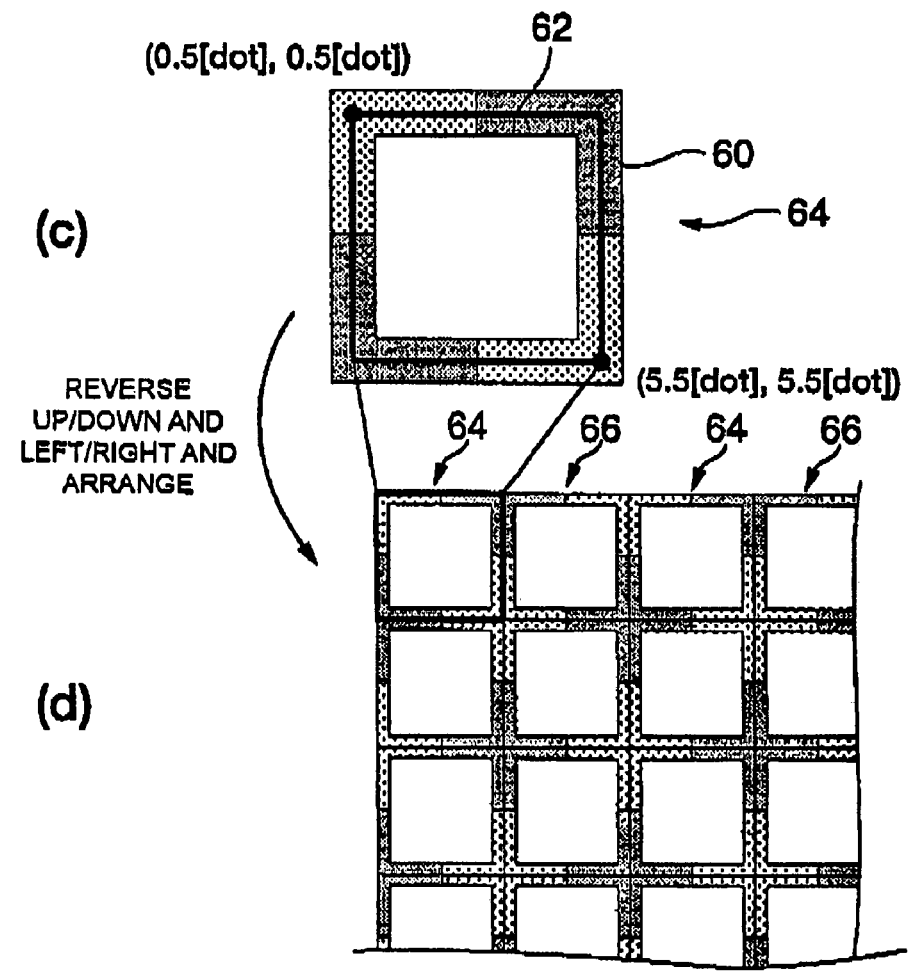

Specifically, as shown in the flowchart of FIG. 4, when the CPU 101 is to generate a repeat image as image information for an electronic game based on an information resource stored in a memory (step S1), as depicted in FIGS. 5(a), (b) and (c), the CPU 101 generates an original image 64 and a reverse image 66 by attaching a texture material 60 having an image size of 6 dots×6 dots to a quadrilateral polygon 62 (step S2). Here, the CPU 101 deletes a partial image of a pixel belonging to an area adjacent to the reverse image among the pixels of the original image 64, and also deletes a partial image of a pixel belonging to an area adjacent to the original image 64 among the pixels of the reverse image 66 (steps S3, S4). For example, in order to form a one-dot pixel in an area where the original image 64 and reverse image 66 are mutually adjacent, an image worth specific dots; for instance, an image worth 0.5 dots of a pixel belonging to an area adjacent to the reverse image 66 among the pixels of the original image 64 is deleted, and an image where the sum of such image worth specific dots becomes an image worth one dot; for instance, an image worth 0.5 dots as an image of a pixel belonging to an area adjacent to the original image 64 among the pixels of the reverse image 66 is deleted. The display example of the original image 64 in this case is shown in FIG. 2(a). Further, the display example of the reverse image 66 is shown in FIG. 2(b).

Next, as illustrated in FIG. 5(d), the original image 64 and reverse image 66 where a partial image (an image worth 0.5 dots) has been deleted are alternately arranged along the horizontal direction (longitudinal direction) and perpendicular direction (vertical direction) in order to generate a single image, the embedding of such image is executed (step S5), and, as shown in FIG. 5(d), the repeat image is displayed (step S6), and the processing of this routine is ended.

As described above, even when a single image is generated by alternately arranging the original image 64 and reverse image 66 in a broad image area, executing the embedding of such image, and displaying the repeat image as shown in FIG. 5(d), 0.5 dot images of pixels belonging to a mutually adjacent area among the pixels of the original image 64 and reverse image 66 will mutually overlap and form a one dot image as a whole. Thus, the image of the joint of the original image 64 and reverse image 66 will become small, and the joint of such images will be less noticeable.

Figure 6:
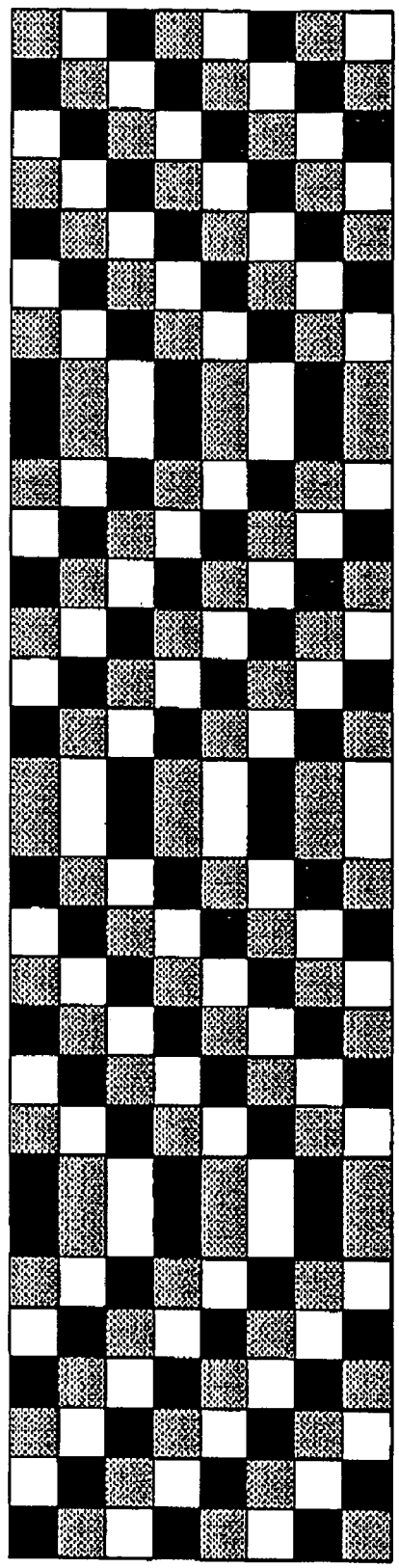
FIG. 6 is a diagram showing a display example of an image of a conventional device.

Contrarily, with the conventional method, as shown in FIG. 6, same colored two-bit pixels are arranged at the joint of the original image 50 and reverse image 54, and it is evident that the joint of the original image 50 and reverse image 54 is noticeable.

According to the present embodiment, upon generating, as a repeat image, an original image and a reverse image by attaching a texture material to a polygon, since a partial image of a pixel belonging to an area adjacent to another image among the pixels of the original image and the reverse image is deleted, and a prescribed image is generated by alternately arranging the original image and reverse image where the partial image thereof has been deleted, the image of the joint of the original image and reverse image will become small, and the joint of such original image and reverse image can be made less noticeable.

Figure 7:
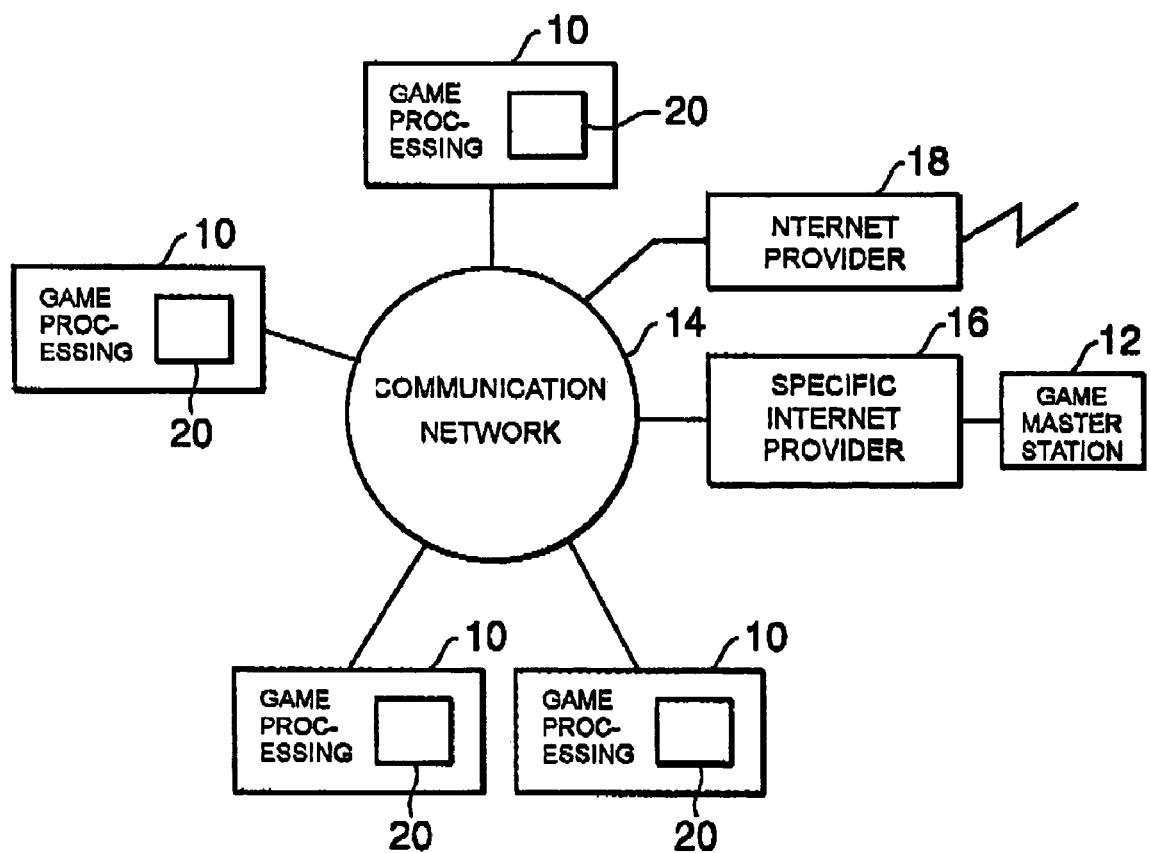
FIG. 7 is a block diagram of a network system upon employing the image processing device according to the present invention to a video game apparatus of a network game system.
Figure 8:
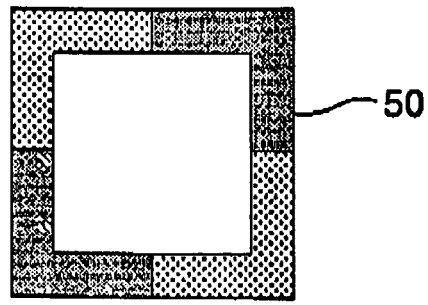
FIGS. 8(a) to (d) are diagrams showing the generation process of a repeat (replayed) image of a conventional image processing device.
Figure 8:
Figure 8:
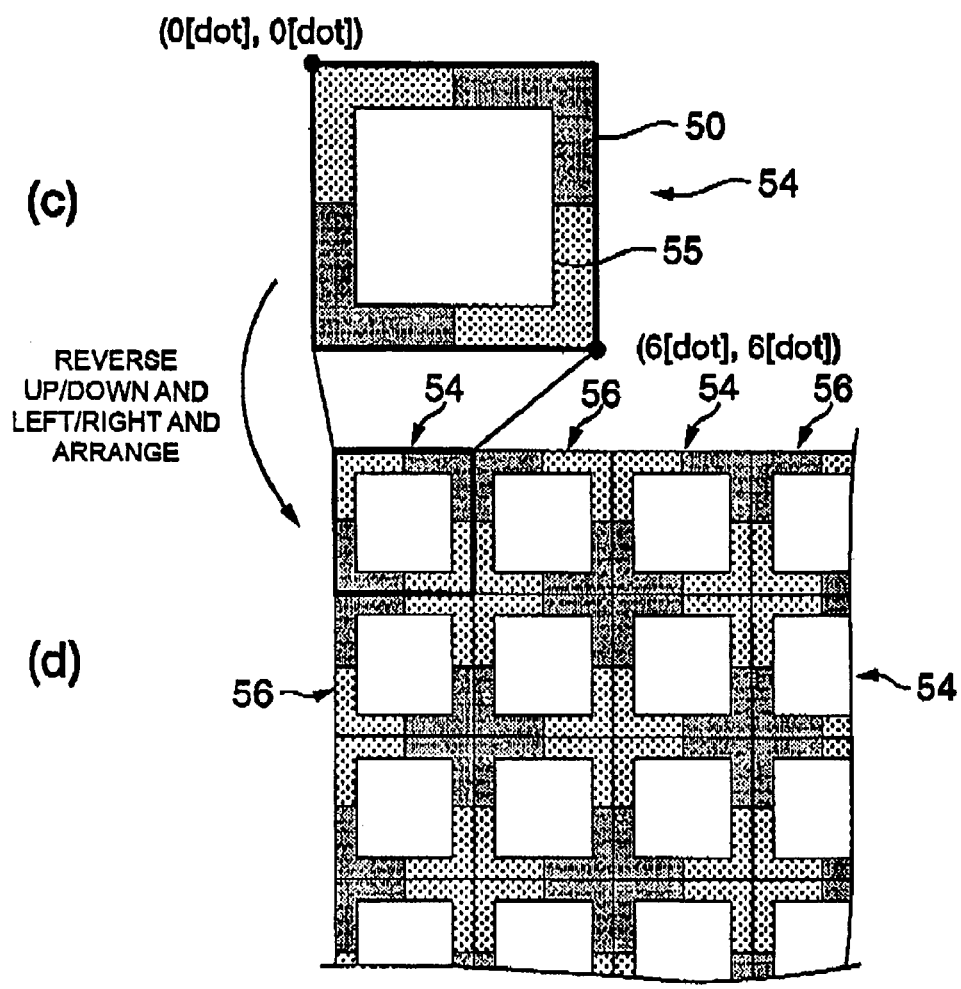

FIG. 7 is a block diagram of a network system when employing the image processing device according to the present invention in a video game apparatus of a network game system. With this network system, a common game application program is executed among the respective video game apparatuses.

This network system has a plurality of terminal devices 10, 10 . . . which are video game apparatuses, a game master station 12 including a plurality of servers, and a communication network 14 for connecting this terminal device 10 and game master station 12. In this system, the terminal device 10 is connected to the game master station 12 via a specific Internet provider 16 prescribed for executing a specific game, and a common game application program is executed among the respective game apparatuses (terminal devices) 10, 10 via the game master station 12. Incidentally, the game apparatus 10 may also be connected to a server via the communication network 14 and an Internet provider 18 that is not the specific Internet provider 16.

In this system, each game apparatus 10 has a personal information processing means 20 for exchanging detailed personal information of each and every game player while executing the game application program.

In this system also, the CPU 101 built in the respective game apparatuses 10, upon generating a repeat image as image information for an electronic game based on an information resource stored in a memory, for instance, as shown in FIGS. 5(a) to (d), generates an original image 64 and a reverse image 66 by attaching a texture material 60 having an image size of 6 dots×6 dots to a quadrilateral polygon 62. Here, the CPU 101 deletes a partial image of a pixel belonging to an area adjacent to the reverse image among the pixels of the original image 64, and also deletes a partial image of a pixel belonging to an area adjacent to the original image 64 among the pixels of the reverse image 66. For example, an image worth 0.5 dots of a pixel belonging to an area adjacent to the reverse image 66 among the pixels of the original image 64 is deleted, an image worth 0.5 dots as an image of a pixel belonging to an area adjacent to the original image 64 among the pixels of the reverse image 66 is deleted, the original image 64 and reverse image 66 where an image worth 0.5 dots has been deleted are alternately arranged to generate a single image, embedding of such image is executed, and this image is displayed as the repeat image as shown in FIG. 5(d).

According to the present embodiment, upon generating, as a repeat image, an original image and a reverse image by attaching a texture material to a polygon, since a partial image of a pixel belonging to an area adjacent to another image among the pixels of the original image and the reverse image is deleted, and a prescribed image is generated by alternately arranging the original image and reverse image where the partial image thereof has been deleted, the image of the joint of the original image and reverse image will become small, and the joint of such original image and reverse image can be made less noticeable.

We claim:

1. An image processing device, comprising;
a memory for storing an information resource for an electronic game;
image processing means for processing image information for the electronic game based on the information resource stored in said memory; and
display means for displaying images of the electronic game target based on the processing results of said image processing means;
wherein said image processing means:
  generates, as a repeat image, an original image by attaching a texture material to a polygon;
  upon generating a reverse image of said original image, deletes a partial image of a pixel belonging to an area adjacent to both said original image and said reverse image among the pixels of said original image and said reverse image; and
  generates a prescribed image by alternately arranging the original image and reverse image where said partial image thereof has been deleted.

2. The image processing device according to claim 1, wherein said image processing means deletes an image worth 0.5 dots of a pixel subject to deletion among the pixels of said original image, and deletes an image worth 0.5 dots of a pixel subject to deletion among the pixels of said reverse image.

3. An image processing device, comprising:
a memory for storing an information resource for an electronic game;
image processing means for processing image information for the electronic game based on the information resource stored in said memory; and
display means for displaying images of the electronic game target based on the processing results of said image processing means;
wherein said image processing means:
  generates, as a repeat image, an original image by attaching a texture material to a polygon;
  upon generating a reverse image of said original image, deletes a partial image of a pixel belonging to an area adjacent to both said original image and said reverse image among the pixels of said original image and said reverse image, and forms a one-dot pixel in an area adjacent to both said original image and said reverse image; and
  generates a prescribed image by alternately arranging the original image and reverse image where said partial image thereof has been deleted.

4. An image processing device, comprising:
a memory for storing an information resource for an electronic game;
image processing means for processing image information for the electronic game based on the information resource stored in said memory; and
display means for displaying images of the electronic game target based on the processing results of said image processing means;
wherein said image processing means:
  generates, as a repeat image, an original image by attaching a texture material to a polygon;
  upon generating a reverse image of said original image, deletes an image worth specific dots of a pixel belonging to an area adjacent to both said original image and said reverse image among the pixels of said original image and said reverse image;
  deletes an image in which the sum thereof with said image worth specific dots becomes an image worth one dot, and forms a one-dot pixel in an area where said original image and said reverse image are mutually adjacent as an image of a pixel belonging to an area adjacent to said original image among the pixels of said reverse image; and
  generates a prescribed image by alternately arranging the original image and reverse image where said partial image thereof has been deleted.

5. An image processing method to be executed with an image processing device comprising an image processing means which processes image information for an electronic game based on an information resource for the electronic game, and displays the respective processing results on a display means, comprising:
an image attachment step of generating, as said repeat image, an original image by attaching a texture material to a polygon, and, upon generating a reverse image of said original image, deleting a partial image of a pixel belonging to an area adjacent to both said original image and said reverse image among the pixels of said original image and said reverse image; and
an image embedding step of generating a prescribed image by alternately arranging the original image and reverse image where said partial image thereof has been deleted at said image attachment step.

6. The image processing method according to claim 5, wherein at said image attachment step, an image worth 0.5 dots of a pixel subject to deletion is deleted among the pixels of said original image, and an image worth 0.5 dots of a pixel subject to deletion is deleted among the pixels of said reverse image.

7. An image processing method to be executed with an image processing device comprising an image processing means which processes image information for an electronic game based on an information resource for the electronic game, and displays the respective processing results on a display means, comprising:
an image attachment step of generating, as said repeat image, an original image by attaching a texture material to a polygon, and, upon generating a reverse image of said original image, deleting a partial image of a pixel belonging to an area adjacent to both said original image and said reverse image among the pixels of said original image and said reverse image, and forming a one-dot pixel in an area where said original image and said reverse image are mutually adjacent; and an image embedding step of generating a prescribed image by alternately arranging the original image and reverse image where said partial image thereof has been deleted at said image attachment step.

8. An image processing method to be executed with an image processing device comprising an image processing means which processes image information for an electronic game based on an information resource for the electronic game, and displays the respective processing results on a display means, comprising:

an image attachment step of generating, as said repeat image, an original image by attaching a texture material to a polygon, and, upon generating a reverse image of said original image, deleting an image worth specific dots of a pixel belonging to an area adjacent to both said original image and said reverse image among the pixels of said original image and said reverse image, deleting an image in which the sum thereof with said image worth specific dots becomes an image worth one dot, and forming a one-dot pixel in an area where said original image and said reverse image are mutually adjacent as an image of a pixel belonging to an area adjacent to said original image among the pixels of said reverse image; and an image embedding step of generating a prescribed image by alternately arranging the original image and reverse image where said partial image thereof has been deleted at said image attachment step.

* * * * *

UNITED STATES PATENT AND TRADEMARK OFFICE
CERTIFICATE OF CORRECTION

PATENT NO. : 7,646,513 B2  Page 1 of 1
APPLICATION NO. : 11/231780
DATED : January 12, 2010
INVENTOR(S) : Miyashita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1147 days.

Signed and Sealed this

Sixteenth Day of November, 2010

David J. Kappos
*Director of the United States Patent and Trademark Office*